June 9, 1964  E. T. YOUNG  3,136,159
FLOWMETER WITH CALIBRATING MEANS
Filed June 30, 1961  2 Sheets-Sheet 2

INVENTOR.
EINAR T. YOUNG
BY Robert O. Spindle
ATTORNEY

United States Patent Office 3,136,159
Patented June 9, 1964

3,136,159
FLOWMETER WITH CALIBRATING MEANS
Einar T. Young, Newtown Square, Pa., assignor to Sun Oil Company, Philadelphia, Pa., a corporation of New Jersey
Filed June 30, 1961, Ser. No. 121,239
6 Claims. (Cl. 73—230)

This invention relates to a flowmeter, and more particularly to a flowmeter of the rotary impeller or turbine type, which operates to produce an electrical signal proportional to the fluid flow in a pipe line or other fluid conduit.

This application is an improvement over my application, Serial No. 15,888, filed March 18, 1960, now abandoned.

After flowmeters of the aforementioned type are manufactured and assembled, and before they are put into service, they must be finally calibrated, so that they will measure the flow of a given fluid consistently with other flowmeters of the same size. This calibration procedure practically always involves a correction of some sort, to eliminate (or at least reduce as much as possible) errors or inconsistencies which arise as a result of unavoidable manufacturing tolerances.

Previously, the calibration correction of turbine-type flowmeters has always been done by means of an external arrangement of one of two sorts. One such external arrangement requires circuitry for electrically dropping pulse-counts (the electrical pulses being produced in the first instance as a result of rotation of the rotary impeller or rotor of the turbine-type mechanism); the other commonly-used external arrangement requires a speed variator, which is used following the translation of the electrical pulse output of the flowmeter into a shaft rotation, and prior to the final register or totalizer.

The external arrangements described are unduly complicated and expensive and, at best, are quite inconvenient in use.

An object of this invention is to provide a rotary or turbine-type flowmeter having a novel internal (i.e., built-in) calibration correction means.

A further object is to provide a turbine-type flowmeter having a novel mechanical calibration correction means, which means is simple, easy to use, and relatively inexpensive.

The objects of this invention are accomplished, briefly, in the following manner:

The fluid-responsive parts of the flowmeter are contained in an elongated housing through which fluid flows during operation of the flowmeter. Such parts include a rotor or rotary impeller which is operable (i.e., rotated) by the flow of fluid through the housing, and a relatively stationary vane structure which is located upstream of the rotor. This vane structure tends to straighten the fluid flow through the flowmeter housing. One end of the vane structure is rigidly fixed in the housing, and for calibration purposes the opposite end of this vane structure is provided with means whereby it may be adjustably rotated (through a small angle) in either sense, about the longitudinal axis of the housing, thereby to adjustably twist or change the position of the surfaces of the several vanes in this structure with respect to the said axis. This adjustable rotation means comprises a hand-screw carrying a flange which engages a ring in which the vanes are mounted. For indication or recording of the rate of flow, the rotor is magnetized, thereby to produce pulses in a pickup coil as the rotor rotates.

A detailed description of the invention follows, taken in conjunction with the accompanying drawings, wherein.

Figure 1:
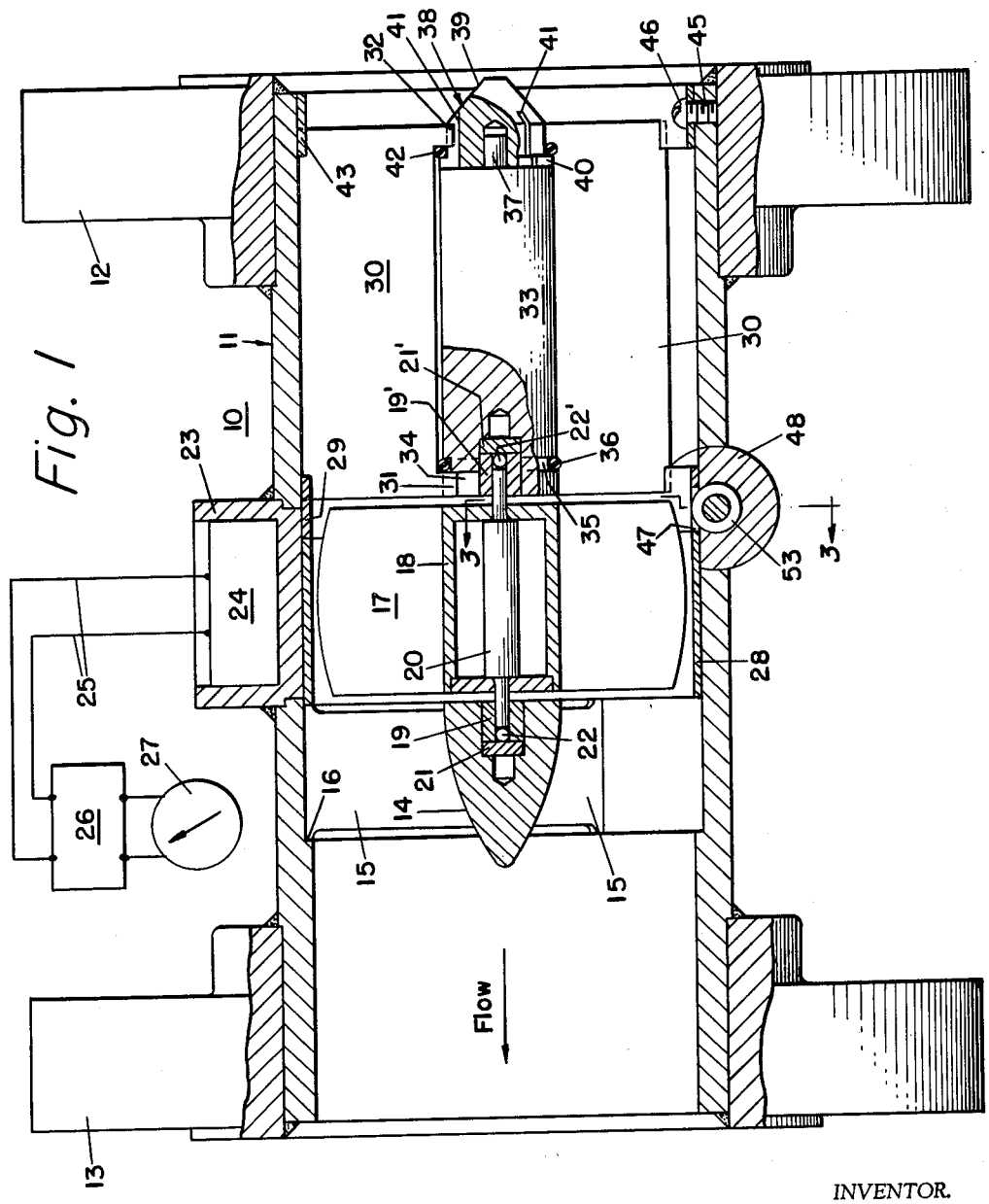
FIG. 1 is a longitudinal sectional view through a flowmeter according to the invention, certain parts being shown in elevation, this view being taken along the line 1—1 of FIG. 2.

Now referring to the drawings, and particularly to FIG. 1 thereof, the flowmeter of this invention is designated generally by the numeral 10. The fluid-flow-responsive parts of the flowmeter 10 are contained in an elongated hollow cylindrical housing or pipe section 11 which has integral, or welded-on annular end flanges 12 and 13 at its respective upstream and downstream ends. Housing 11 is made of a suitable nonmagnetic material, such as stainless steel. By means of bolts (not shown) which pass through holes provided in flanges 12 and 13 and through matching holes provided in similar flanges fastened on adjacent sections of a pipe line, the flowmeter 10 may be mounted in the pipe line. The pipe line referred to is a flow pipe carrying a fluid, and it is intended that the longitudinal axis of housing 11 be substantially collinear with the longitudinal axis of the pipe line. Therefore, when the flowmeter 10 is in use, the fluid flows through housing 11 in a direction substantially parallel to the longitudinal axis of this housing. This direction of fluid flow is indicated by an appropriate arrow and legend in FIG. 1.

A spider or spoke construction is utilized for mounting a downstream bearing 14 (whose outer surface is of streamlined shape) in position axially of housing 11. The outer streamlined periphery of bearing 14 is fixedly secured to the inner ends of three thin equiangularly-spaced (120° apart) ribs 15 which extend radially outwardly from the bearing 14 to terminate at the inner cylindrical wall of an enlarged-diameter portion of housing 11. The arrangement is such that the longitudinal center line of bearing 14 is collinear with the longitudinal axis of housing 11. The bearing 14 is prevented from moving downstream by the ribs 15, the downstream radially outer corners of which engage a shoulder 16 formed at one end of the aforementioned enlarged-diameter portion of housing 11. The open space between ribs 15 permits free passage of fluid downstream past these ribs. When fluid is flowing through the flowmeter, the fluid flow tends to urge the corners of ribs 15 tightly against shoulder 16, resulting in sufficient friction here to prevent any rotation of ribs 15 by rotor 17, as the latter rotates.

Figure 3:
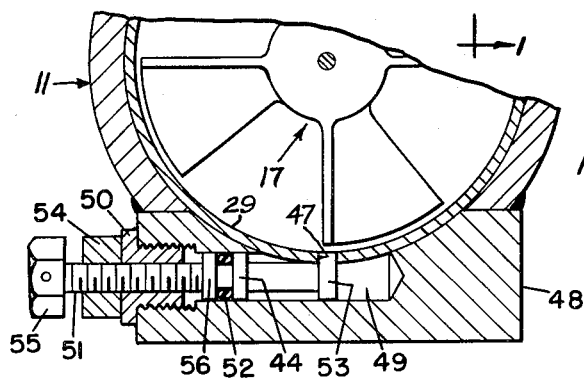
FIG. 3 is a partial sectional view of the flowmeter, taken along the line 3—3 of FIG. 1.

A rotary impeller or rotor 17 is positioned upstream of bearing 14 and is journaled for rotation (at its downstream end) in bearing 14, in a manner to be described hereinafter. This rotor is intended to rotate freely, within the housing 11, about an axis coinciding with the longitudinal axis of this housing. Rotor 17 has a plurality (four, for example) of thin blades which extend radially from a central hollowed-out hub 18 toward the inner wall of housing 11. These blades are equiangularly spaced around hub 18, are elongated in the direction of fluid flow, and the point of attachment of each respective blade to the upstream end of the hub is angularly displaced from the point of attachment of the same blade to the downstream end of the hub; thus, the rotor or impeller blades have a helical pitch, like the threads of a screw. In FIG. 3, a part of the rotor may be seen, looking at the end thereof.

At the upstream or larger-diameter end of bearing 14, a bearing sleeve 19 is positioned in an axial bore in bearing 14; this bore extends a suitable distance downstream from the upstream end of the bearing. A shaft 20 extends entirely through the hub 18 and projects beyond this hub both at the upstream and downstream ends of the rotor; this shaft is firmly secured to the hub (and also the rotor), and rotates therewith. The axis of shaft 20 coincides with the longitudinal axis of housing 11. The downstream end of shaft 20 extends into and engages the stationary sleeve 19.

To complete the downstream bearing for the impeller, to thereby journal for rotation (about the housing longitudinal axis) the downstream end of the rotor, a bearing disk 21 is positioned transversely of the axial bore in bearing 14, at the bottom of this bore, and a polished stainless steel ball 22 (one-eighth inch in diameter, for example) is positioned between the end of shaft 20 and disk 21.

The rotor 17 is made of a certain particular type of stainless steel which has ferromagnetic properties. Prior to installation in the housing 11, the rotor is magnetized so that the blades thereof act as permanent magnets, the magnetic poles being arranged to provide the proper number of output pulses during each revolution of the rotor.

One end of a hollow pipe or electrical conduit 23 is secured (e.g., by welding) to the outer wall of housing 11 at approximately the center of the length thereof, this pipe extending in a radial direction outwardly from the outside of the cylindrical housing. An electrical pickup coil 24 is positioned in pipe 23, being secured therein in any suitable manner. Coil 24 is inductively coupled to the magnetized rotor 17. A pair of electrical leads or wires 25 are connected to respective opposite ends of the coil 24, and extend from this coil to the input of a pulse amplifier 26, to the output of which is coupled an integrator 27 (illustrated as a meter). Alternatively, a mechanical counter may be coupled to the amplifier output.

Since housing 11 is nonmagnetic and since coil 24 is inductively coupled to the magnetized rotor 17, each time that the rotor rotates one or more electrical pulses (the number of pulses depending on the particular manner in which the rotor is magnetized) will be generated in coil 24. These pulses are amplified by amplifier 26 and used to operate a mechanical counter (not shown), or are applied to the integrator 27. By applying the appropriate meter factor (factor of proportionality) to the counter reading, or to the integrator reading, the total fluid flow, in volume units, will be obtained. This may be appreciated from the fact that the rate of rotation of the rotor 17 is directly proportional to the rate of fluid flow through the flowmeter; thus, the total number of revolutions of the rotor during a given time interval (which total number of revolutions is obtained by integration or mechanical counting) is proportional to the total volume of fluid flow during this same time interval.

A fixed mounting ring member 28 is positioned just upstream of the rib structure 15, the outer surface of this ring abutting the inner cylindrical wall of the enlarged-diameter portion of housing 11. The length of ring 28 is somewhat less than the axial length of the blades of rotor 17, and the downstream end of this ring engages the upstream radially outer corners of ribs 15. Ring 28 may be made of stainless steel.

A supporting ring member 29 is positioned just upstream of ring member 28, the ring 29 having the same diameter as ring 28 and being capable of rotation through a small angle about the longitudinal axis of the housing 11, for calibration adjustment purposes. This will be explained in detail hereinafter. The downstream end of ring 29 abuts the upstream end of ring 28, and the opposite end of ring 29 extends some distance upstream of the upstream ends of the blades of rotor 17. Ring 29 may be made of stainless steel.

Figure 2:
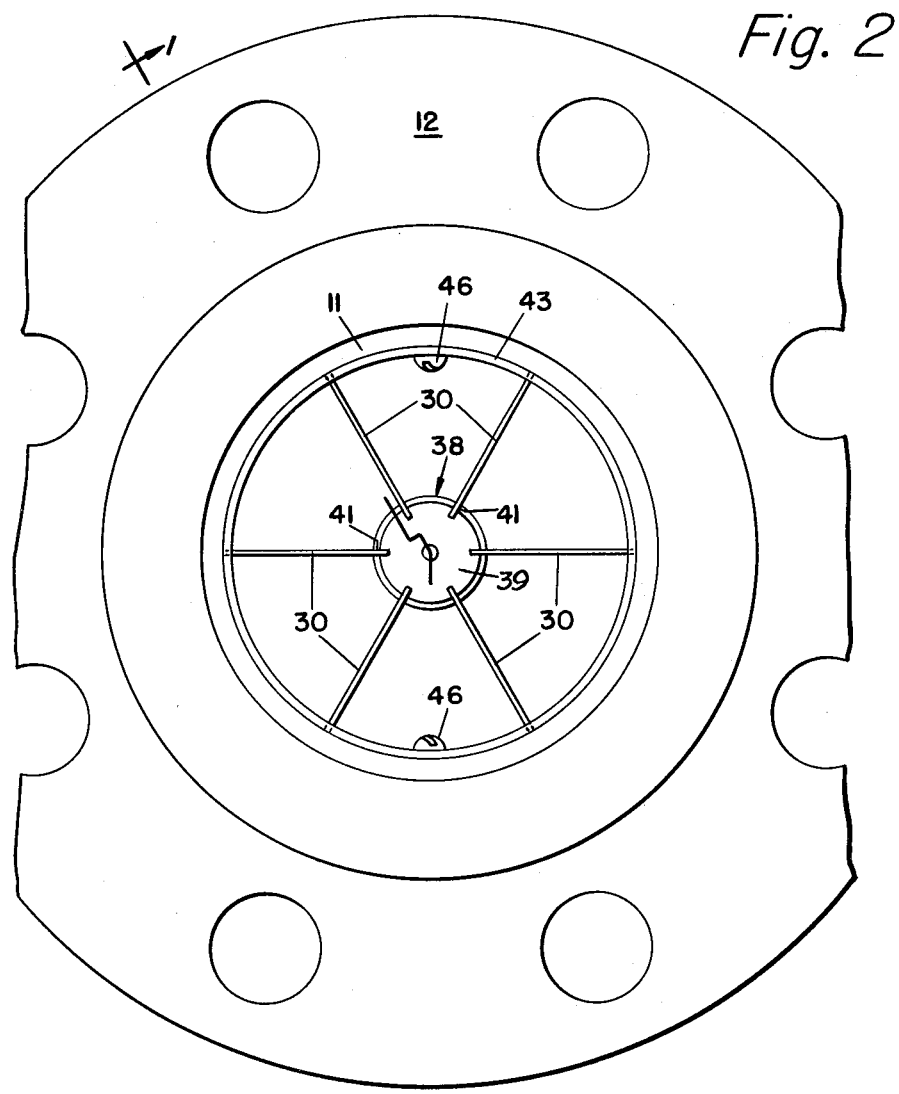
FIG. 2 is an end view of the flowmeter of FIG. 1.

A vane structure, comprising a set or group of six radially-extending and longitudinally-extending thin planar vanes 30 (see FIG. 2) is positioned in housing 11, upstream of rotor 17. Vanes 30 may be made of stainless steel. These vanes are equiangularly spaced (60° apart) around a central hub like the spokes of a wheel, see FIG. 2. Vanes 30 are substantially rectangular in configuration, but at its downstream end each vane has a small integral rectangular tab 31 which extends radially inwardly from the main body of the vane, and at its upstream end each vane has a small integral rectangular tab 32 which extends radially inwardly from the main body of the vane. The longer dimension of the substantially rectangular vane body extends parallel to the longitudinally rectangular vane body extends parallel to the lonigtudinal axis of housing 11, and the shorter dimension of the substantially rectangular vane body extends radially of the housing.

In general, during operation of the flowmeter to measure fluid flow, all of the vanes 30 remain fixed in position or stationary with respect to the housing 11. However, according to this invention they are manually adjustable or movable, for calibration purposes. This adjustment will be described in detail presently.

Six equiangularly-spaced and longitudinal-extending slots, each of limited length in the direction parallel to the housing axis or in the direction of fluid flow, are provided in the right-hand (in FIG. 1) or upstream end of ring 29. These latter slots are all cut completely through the wall thickness of ring 29 and they each extend from the righthand end of this ring a short distance toward the left-hand or downstream end thereof. The width (in the transverse direction) of each of these slots in ring 29 is such as to accommodate rather snugly therein the downstream radially outer ends of respective ones of the vanes 30. Thus, the downstream radially outer ends of vanes 30 are located by these latter slots in ring 29, and are mounted and retained in position by this ring. The end wall delineating each respective one of these last-mentioned slots in ring 29 (at the downstream ends of the slots) prevents undesired movement of the outer ends of vanes 30 in the downstream direction. Due to the snug fit of the downstream radially outer ends of vanes 30 in their respective slots in ring 29, when the latter is rotated for calibration purposes (in a manner to be described hereinafter), these ends of vanes 30 are made to rotate through the same angle as ring 29.

A solid generally cylindrical central hub member 33, which may be made of stainless steel, is provided to position and mount the radially inner ends of the vanes 30, and also to provide an upstream bearing for the rotor or impeller 17. The longitudinal axis of hub 33 coincides with that of the housing 11.

To provide an upstream bearing for rotor 17, a bearing sleeve 19' is positioned in an axial bore located in the downstream end of hub 33; this bore extends a suitable distance upstream from the downstream end of the hub. The upstream end of shaft 20 extends into and engages the stationary sleeve 19'. The bearing disk 21' and the ball 22' are similar to the respective elements 21 and 22 previously described, and perform the same functions. By means of the structure just described, including elements 19', 21' and 22', the upstream end of the impeller 17 is journaled for rotation about the housing longitudinal axis.

At the downstream end of hub 33, six radial and longitudinally-extending slots 34 (60° apart) are cut into this hub. The length of each of these slots (measured parallel to the housing longitudinal axis) is equal to the length of vane tabs 31 (also measured parallel to the housing longitudinal axis), and each of the slots 34 extends (in a radial direction) from the outer surface of member 33 to the axial bore therein. The width of slots 34 is such as to accommodate rather snugly therein (in a transverse direction) the respective vane tabs 31. Thus, the radial slots 34 space the vanes 30 equiangularly around the hub 33. In assembled position, each of the slots 34 is radially aligned with a respective one of the slots in ring 29.

Immediately adjacent to the upstream ends of hub slots 34, a circumferentially-extending channel 35 is cut into hub 33, channel 35 having sufficient (axial) length and (radial) depth to accommodate snugly therein an O-ring 36 whose radially outer portion engages the downstream, radially inner end of the main body portions of the vanes 30 and prevents undesired radially-inward movement at such ends of the vanes. In this way, the radially outer edges of all the vanes 30 are maintained closely adjacent the inner cylindrical wall of housing 11. The engagement of the vanes with O-ring 36 (and with a similar O-ring 42 at the upstream ends of the vanes, to be later described) provides a small clearance between the radially inner edges of the main body portions of vanes 30 and the outer cylindrical surface of hub 33. Also, engagement of the upstream edges of vane tabs 31 by the continuous O-ring 36 (which latter fits within the channel or recess 35 of U-shaped cross-section) assists in preventing displacement of the vanes in the upstream direction.

At its upstream end, the diameter of hub 33 is cut down to leave a short integral longitudinally-extending dowel 37. A generally cylindrical cap member 38 is provided with an axial bore into which dowel 37 fits with a small side clearance. The bore just mentioned extends into cap member 38 from the downstream face thereof. The maximum diameter of cap member 38 is equal to that of the main body of hub 33; thus, at its downstream end cap member 38 has a circular face which seats against the upstream end of the main body of hub 33. Cap member 38 has a somewhat pointed (frusto-conical) upstream end 39, to offer a minimum resistance to fluid flow. Member 38 may be made of the tetrafluoroethylene resin material known as "Teflon."

At its downstream end, member 38 has an outwardly-extending integral collar 40, of rather short length measured parallel to the housing axis. The outer periphery of this collar defines the maximum diameter, previously referred to, of cap 38. Six radial and longitudinally-extending slots 41 (60° apart) are cut into cap member 38, these slots extending entirely through member 38, in the axial direction. The (radial) depth of these slots, measured radially inwardly from the outer periphery of collar 40, is somewhat greater than the radial dimension of vane tabs 32. The width of slots 41 is such as to accommodate rather snugly therein (in a transverse direction) the respective vane tabs 32. Thus, the radial slots 41 space the vanes 30 equiangularly around the cap 38. Slots 41 are originally longitudinally aligned with respective ones of the slots 34.

The upstream annular face of collar 40 defines one side of a channel within which is positioned an O-ring 42 similar to O-ring 36. When the flowmeter is in assembled position, the vane tabs 32 fit into slots 41 in member 38, and the downstream edges of these tabs define the other (or upstream) side of the channel for O-ring 42. The radially outer portion of O-ring 42 engages the upstream, radially inner ends of the main body portions of the vanes 30 and prevents undesired radially-inward movement at such ends of the vanes. This assists in maintaining the radially outer edges of all the vanes 30 closely adjacent the inner cylindrical wall of housing 11. As previously stated, the engagement of the vanes with O-ring 42 helps to maintain the small clearance between the radially inner edges of the main body portions of vanes 30 and the outer cylindrical surface of hub 33. Engagement of the downstream edges of vane tabs 32 by the continuous O-ring 42 (which latter fits within the channel defined for it by these tabs and by collar 40), and the engagement of the upstream face of collar 40 by this same O-ring, assists in preventing displacement of the hub 33 in the upstream direction.

In order to maintain the upstream, radially outer ends of vanes 30 fixed in position, a locking ring 43 is utilized. This ring may be made of stainless steel. Ring 43 is mounted at the upstream end of housing 11, and has the same diameter as rings 28 and 29. Preferably, the upstream end of ring 43 is coplanar with the upstream end of housing 11. Six equiangularly-spaced and longitudinally-extending slots, each of limited length in the direction parallel to the housing axis or in the direction of fluid flow, are provided in the left-hand (in FIG. 1) or downstream end of ring 43. These slots are all cut completely through the wall thickness of ring 43 and they each extend from the left-hand end of this ring a short distance toward the right-hand or upstream end thereof. The slots are originally longitudinally aligned with respective ones of the slots in ring 29. The width (in the transverse direction) of each of these slots is such as to accommodate rather snugly therein the upstream radially outer ends of respective ones of the vanes 30. Thus, the upstream radially outer ends of vanes 30 are located by these slots, and are mounted and retained in position by this ring. The end wall delineating each respective one of the slots (at the upstream ends of these slots) prevents undesired movement of the outer ends of vanes 30 in the upstream direction.

Locking ring 43 is rigidly fastened to housing 11, to prevent any rotation of the upstream ends of vanes 30, this result being made possible by the snug fit of the upstream radially outer ends of vanes 30 in their respective slots. The way in which this rigid fastening is effected will now be described. Two holes, spaced 180° apart, are drilled through the wall thickness of ring 43, each hole being exactly centered between two adjacent ones of the vane slots in ring 43 and the holes preferably being centered between the upstream and downstream ends of ring 43. Two corresponding diametrically opposite and transversely-extending tapped holes 45 are provided in the cylindrical wall of housing 11, near the upstream end thereof. Machine screws 46 (made, for example, of stainless steel) pass through the respective holes in ring 43 and thread into the respective tapped holes 45, thereby to rigidly fasten ring 43 to housing 11.

As fluid moves through the flowmeter from right to left in FIG. 1, the flow is straightened by the stationary vanes 30, upstream from the rotor 17. As the fluid passes impeller 17, the impeller is rotated, due to the helical pitch of the impeller blades. If the flow is uniform and if no excessive friction is present in the rotor bearings, the rate of rotation of the impeller will be directly proportional to the fluid flow rate. The factor of proportionality (or meter factor) will be determined by the net area at the impeller, the pitch of the impeller blades, and the pitch or twist (if any) of the straightening vanes 30 with respect to the longitudinal axis of the housing.

For ease of calculation and bookkeeping, and for accuracy in cases where several flowmeters are used in a proportioning system, the flowmeters should be calibrated so that the final meter factors are identical, for a given size and a given fluid. This was previously done, ordinarily, by relatively complicated and expensive equipment external to the flowmeter. The present invention provides a relatively simple and inexpensive means for calibrating, and for the concomitant calibration correction. The mechanically-operable means for effecting adjustment of the calibration according to this invention is built into the flowmeter. Such means will now be described.

A narrow elongated slot 47, of limited length, is provided at the downstream end of ring 29, slot 47 being exactly centered between two adjacent ones of the six vane-holding slots in this ring, previously described. Slot 47 is cut completely through the wall thickness of ring 29, and extends from the left-hand end of this ring a short distance toward the right-hand or upstream end thereof.

Now refer also to FIG. 3. Adjacent the left-hand (in FIG. 1) or downstream end of ring 29, an arcuate opening (whose axis extends transversely to the longitudinal axis of the housing) is cut into the lower portion of the housing, this opening extending through the housing wall and into the housing interior. A substantially cylindrical block 48 is fastened, as by welding, in the aforesaid opening, the axis of this block then extending in a direction transverse to the housing longitudinal axis. A tapped bore extends axially into this block, and this bore is aligned with a cylindrical bore 49 (of somewhat smaller diameter) a portion of whose length opens into the interior of housing 11. A bushing 50 threadedly engages the tapped bore just mentioned; this bushing is provided with female threads, as well as the male threads which engage the tapped bore in block 48. An adjusting screw 51 threadedly engages bushing 50 and extends through this bushing into the cylindrical bore 49. For sealing purposes, an O-ring 52 is provided around screw 51, to prevent fluid from leaking out of housing 11 around this screw. O-ring 51 is positioned on screw 51, between an inner integral shoulder 44 and an outer integral shoulder 56. The threadedly-mounted screw 51 may be thought of as a rotatably-mounted shaft.

At the inner end of screw 51, there is an integral cylindrical disk-like flange 53 whose diameter is just a little less than that of cylindrical bore 49, such that the flange can rotate within this bore, and also move longitudinally thereof. Flange 53 fits ito the narrow slot 47 in ring 29, in such a way that the end faces of the flange can engage the sides of slot 47 (see FIG. 1). When screw 51 is rotated, flange 53 engages the sides of slot 47 and, because of the axial movement of screw 51, forces ring 29 to rotate about the housing axis, thereby rotating or twisting the vanes 30 from the downstream, radially outer ends thereof. The downstream, radially inner ends of the vanes rotate at the same time, since the vanes are quite rigid along their radial dimension; the hub 33 rotates along with the vanes due to the engagement of vane tabs 31 with the slots 34. Because of the construction (including the dowel 37, which fits into a bore in member 38) at the upstream end of the flowmeter, hub 33 is free to move relatively to cap member 38. Member 38 may remain fixed during the aforementioned adjustment of the vanes, or it may move slightly; in any event, its movement is small compared to the movement of hub 33 and the downstream ends of the vanes. Thus, as ring 29 rotates, the vanes 30 are rotated or twisted with respect to the longitudinal axis of the housing 11, from their downstream ends. That is to say, each whole vane is caused to swing, from its downstream end, in such a way as to pivot about its upstream end. It should be apparent that the upstream, radially outer ends of the vanes are held fixed by the locking ring 43.

As a result of the above-described action, which rotates or pivots the vanes with respect to the longitudinal axis of the housing 11, the surfaces of the vanes are adjustably twisted with respect to the housing axis, in one direction or the other. When the length dimensions of the vanes 30 are adjustably twisted (i.e., rotated) out of parallelism with the housing axis (in either selected direction or sense) as previously described, the fluid stream is twisted or rotated correspondingly, as the latter proceeds through the guiding vane structure. This rotation of the fluid stream, as a result of the twisting or pivoting of the stationary vanes 30, changes the impeller or rotor rotation, or the "meter factor." More specifically, this twist or rotation of the fluid stream changes the angle of approach of the fluid stream to the rotor blades, causing the rotor 17 to make more or fewer rotations per unit of fluid volume, thereby changing the calibration of the flowmeter. The sense of this change in the number of rotations of the impeller depends of course on the particular sense or direction of twist of the vanes 30, as determined by the direction of rotation of adjusting screw 51.

A lock nut 54 is provided on screw 51, this nut being tightened against the outer face of bushing 50 to lock screw 51 in position, after the latter has been adjusted to the setting for the desired "meter factor."

The end faces of flange 53 fit rather closely against the side walls of the slot 47 in ring 29. During normal operation of the flowmeter, that is, after the same has been calibrated, the adjusting screw 51 and its flange 53 are held firmly in position by lock nut 54, as just described. Therefore, during such normal operation, ring 29 is prevented from rotating, so that the downstream ends of the vanes 30 are held in their adjusted position.

A nut 55 pinned to the outer end of screw 51 provides for convenient rotation of screw 51, during the manual calibration adjustment procedure. Excessive motion of screw 51, inwardly, is prevented by nut 55 coming into engagement with lock nut 54. Excessive motion of screw 51, outwardly, is prevented by the outer face of screw shoulder 56 coming into engagement with the inner end of bushing 50.

The invention claimed is:

1. A flowmeter comprising an elongated housing adapted to be inserted in a fluid flow pipe to thereby establish a flow of fluid through said housing in a direction substantially parallel to the longitudinal axis of said housing; a rotor positioned in said housing and operable by the flow of fluid therethrough; a plurality of vanes located upstream from said rotor, each vane extending in radial and axial directions in said housing; a ring member abutting the inner wall of said housing at a location adjacent one axial end of said vanes, said member being constructed and arranged for rotary movement about the axis of said housing and having means formed therein mounting the radially outer edges of all of said vanes, at said one axial end thereof, to firmly secure all of said vanes to said member; manually operable driving means coupled to said member for causing rotary movement thereof; a fixed ring member abutting the inner wall of said housing at a location adjacent the other axial end of said vanes and having means formed therein mounting the radially outer edges of all of said vanes, at said other axial end thereof, to firmly secure all of said vanes to said fixed member; and means supporting in position, in said housing, the radially inner edges of all of said vanes, at both said one and said other axial ends thereof.

2. A flowmeter as defined in claim 1, wherein said one axial end is the downstream end and said other axial end is the upstream end.

3. A flowmeter as defined in claim 1, wherein the driving means comprises a shaft rotatably mounted with respect to said housing, said shaft having at its inner end a flange which extends into an elongated slot in said first-mentioned ring member.

4. A flowmeter as defined in claim 1, wherein said one axial end is the downstream end and said other axial end is the upstream end, and wherein the driving means includes a shaft extending through the wall of said housing and having its inner end in engagement with said first-mentioned ring member.

5. A flowmeter as defined in claim 1, wherein said one axial end is the downstream end and said other axial end is the upstream end, and wherein the driving means comprises a shaft rotatably mounted with respect to said housing, said shaft having at its inner end a flange which extends into an elongated slot in said first-mentioned ring member.

6. A flowmeter as defined in claim 1, wherein the last-mentioned means supports the radially inner edges of said vanes in fived angular relation to each other.

References Cited in the file of this patent

UNITED STATES PATENTS

| | | |
|---|---|---|
| 2,896,084 | MacDonald | July 21, 1959 |
| 2,934,947 | Buck | May 3, 1960 |
| 2,949,764 | Knauth | Aug. 23, 1960 |